(12) United States Patent
Kobrin et al.

(10) Patent No.: US 6,540,928 B1
(45) Date of Patent: Apr. 1, 2003

(54) MAGNETIC POLE FABRICATION PROCESS AND DEVICE

(75) Inventors: Boris Kobrin, San Francisco, CA (US); Edward Ostan, St. Petersburg, FL (US)

(73) Assignee: Unaxis USA Inc., St. Petersburg, FL (US)

( * ) Notice: Subject to any disclaimer, the term of this patent is extended or adjusted under 35 U.S.C. 154(b) by 79 days.

(21) Appl. No.: 09/658,023

(22) Filed: Sep. 8, 2000

Related U.S. Application Data

(60) Provisional application No. 60/153,074, filed on Sep. 10, 1999.

(51) Int. Cl.⁷ .................................................. B81C 1/00
(52) U.S. Cl. ........................... 216/22; 216/39; 216/47; 216/49; 29/603.07; 205/119; 430/432
(58) Field of Search ................................ 430/432, 312, 430/314, 320, 322; 216/22, 39, 47, 49, 51, 67, 68; 29/603.07; 205/119, 122, 131, 135, 255

(56) References Cited

U.S. PATENT DOCUMENTS

| | | | |
|---|---|---|---|
| 4,209,349 A | 6/1980 | Ho et al. ..................... 148/187 |
| 4,358,340 A | 11/1982 | Fu .............................. 156/643 |
| 4,377,437 A | 3/1983 | Taylor et al. ............... 156/628 |
| 4,377,734 A | 3/1983 | Mashiko et al. ...... 219/121 PE |
| 4,389,482 A | 6/1983 | Bargon et al. .............. 430/325 |
| 4,419,809 A | 12/1983 | Riseman et al. .............. 29/571 |
| 4,445,267 A | 5/1984 | De La Moneda et al. .... 29/571 |
| 4,502,914 A | 3/1985 | Trumpp et al. ............. 156/643 |
| 4,504,574 A | 3/1985 | Meyer et al. ............... 430/331 |
| 4,552,833 A | 11/1985 | Ito et al. ..................... 430/325 |
| 4,601,778 A | 7/1986 | Robb .......................... 156/643 |
| 4,613,398 A | 9/1986 | Chiong et al. .............. 156/628 |
| 4,657,845 A | 4/1987 | Frechet et al. ............. 430/326 |
| 4,690,729 A | 9/1987 | Douglas ..................... 156/643 |
| 4,751,170 A | 6/1988 | Mimura et al. |
| 4,803,181 A | 2/1989 | Buchmann et al. ......... 437/228 |
| 4,886,565 A | 12/1989 | Koshiba et al. ............. 156/345 |
| 5,599,745 A | 2/1997 | Reinberg .................... 437/195 |
| 5,607,542 A | * 3/1997 | Wu et al. ................. 118/723 I |
| 5,665,251 A | 9/1997 | Robertson et al. ............ 216/22 |
| 5,788,447 A | 8/1998 | Yonemitsu et al. ......... 414/217 |
| 5,792,593 A | 8/1998 | McClure et al. ............ 430/314 |
| 5,825,609 A | 10/1998 | Andricacos et al. ..... 361/321.4 |
| 5,851,733 A | 12/1998 | Sezi et al. .................. 430/311 |
| 5,858,621 A | 1/1999 | Yu et al. ..................... 430/313 |
| 5,863,705 A | 1/1999 | Sezi et al. .................. 430/311 |
| 5,895,273 A | 4/1999 | Burns et al. ................ 438/719 |
| 6,100,014 A | 8/2000 | Lin et al. .................... 430/314 |
| 6,110,637 A | 8/2000 | Sezi et al. ............... 430/270.1 |

FOREIGN PATENT DOCUMENTS

JP 4-14049 1/1992

OTHER PUBLICATIONS

Wolf–Dieter Domle, "Chemical amplification of resist lines: The CARL process", Microlithography World, Spring 1999, pp. 2–5.

"Nanometer Sidewall Lithography By Resist Silylation", P. Vettiger, et al., J. Vac. Sci. Technol., Nov./Dec. 1989, vol. 7, No. 6, pp. 1756–1759.

* cited by examiner

*Primary Examiner*—Allan Olsen
(74) *Attorney, Agent, or Firm*—Foley & Lardner

(57) ABSTRACT

A method and apparatus for fabricating an electroplating mask for the formation of a miniature magnetic pole tip structure. The method incorporates a silylation process to silylate photoresist after creating a photoresist cavity or trench in the electroplating mask. The silylation process is performed after a dry etch of the photoresist. Alternatively, silylation is performed after a lithographic patterning of the trench. As a result of chemical biasing, the vertical side walls of the photoresist layer shift inward creating a narrower trench. The resulting structure formed after electroplating has a width of less than 0.3 micrometers. This structure can be used as a magnetic pole of a thin film head ("TFH") for a data storage device.

16 Claims, 5 Drawing Sheets

101

103

105

107

109

111

SIDEWALL SHIFT VS SILYLATION TIME

MAGNETIC POLE FABRICATION PROCESS AND DEVICE

This application claims priority of U.S. provisional Application No. 60/153,074 filed on Sep. 10, 1999, the entirety of which is hereby incorporated by reference.

BACKGROUND OF THE INVENTION

Field of the Invention

The present invention is directed to a method and apparatus for forming sub-micrometer structures on a substrate. In one embodiment, these structures can be magnetic poles of thin film heads for data storage devices.

Many electronic products require the construction of miniature metallic structures. An example of such a structure is the second pole tip of a thin film recording head. Conventional processes for the fabrication of magnetic recording heads often comprise a combination of lithographic, deposition, plating, and etching processes. Typical recording heads are formed on $Al_2O_3$/TiC ceramic wafers that are eventually formed into sliders that fly over magnetic disks to perform read and write functions.

In a thin film recording head, it is desirable that the width of the pole tip of a second pole piece is made as narrow as possible in order to increase track density, which represents the number of tracks per inch width of the recording medium on which the head writes. The higher the track density, a greater number of bits per a greater area can be stored on the magnetic medium. The effort to produce narrower track-widths is a constant challenge to the field.

One conventional method of creating pole structures is to fabricate a mask or "resist frame for plating" in conjunction with an electroplating process. For example, a conventional image transfer process to create an anisotropic cavity or trench in a semiconductor device, with the cavity having a seedlayer as the floor, is discussed in U.S. Pat. No. 5,665,251 (the '251 patent) and is shown in FIG. 1.

In FIG. 1, a seedlayer 11 is formed over a substrate 10. A thick photoresist layer 12 is formed over seedlayer 11. A masking layer 13 is formed on top of the thick photoresist layer 12, then a thin photoresist layer 14 is formed on masking layer 13.

The magnetic pole structure then can be created on the seedlayer 11 in the cavity 16, with the seedlayer providing an electrical path to the structure. A portion 15 of thin resist layer 14 is first removed in steps 101 (exposure to light) and 103 (wet development with an aqueous solution). In step 105, mask layer 13 is etched by a reactive ion etching ("RIE") process. To create the cavity, thick layer 12, typically of polymeric photoresist, is etched (in step 107) using a RIE process. RIE is used to etch the thick layer because RIE can produce highly anisotropic cavities. However, RIE can also damage the underlying seedlayer. To prevent this damage during photoresist etching, a deposition of a protective layer, such as alumina or silicon dioxide, (not shown), can be formed on top of the seedlayer 11. After the creation of the cavity, the protective layer in the bottom of the cavity is removed in a subsequent step which does not damage the seedlayer nor undercut the thick layer. An electro-deposition process (step 109) is used to form a pole structure 18. The remaining thick photoresist layer 12 is then removed by further RIE etching.

It is desirable, however, to improve upon conventional processes, such as the process described above, in order to fabricate narrower pole structures for greater track densities on recording media. Such narrower pole structures preferably would have widths less than about 0.3 micrometers ($\mu$m).

SUMMARY OF THE INVENTION

In view of the foregoing, it would be desirable to provide a process for the fabrication of sub-micrometer structures on a substrate. According to one embodiment of the present invention, a method for fabricating a multi-layer electroplating mask for the formation of a submicrometer structure is provided. The multi-layer electroplating mask includes a substrate, a seedlayer deposited on the substrate, a first photoresist layer deposited on the seedlayer, a hard mask layer deposited on the first photoresist layer, and a second photoresist layer (or image layer) deposited on the hard mask layer. The first photoresist layer preferably is thicker than said second photoresist layer. The method includes performing a photoresist etch of the first photoresist layer to define a trench having vertical sidewalls. After the photoresist etch, a silylation of the trench is performed for a predetermined period of time to narrow the trench in width. From this electroplating mask, structures, such as magnetic pole pieces, can be formed having widths of less than or equal to 0.3 micrometers. Of course, the present invention can be used to form structures having widths greater than 0.3 micrometers if desired.

According to another embodiment of the present invention, a method for fabricating a multi-layer electroplating mask for the formation of a submicrometer structure is provided. The multi-layer electroplating mask includes a substrate, a seedlayer deposited on the substrate, and a photoresist layer deposited on the seedlayer. The photoresist layer has a thickness of about 4 micrometers to about 6 micrometers. The method comprises lithographically patterning the photoresist layer with an exposure to light to define a trench having vertical sidewalls. A silylation of the trench is performed for a predetermined period of time to narrow the trench in width. From this electroplating mask, structures, such as magnetic pole pieces, can be formed having widths of less than about 0.3 micrometers.

Further features and advantages of the invention, as well as the structure and operation of various embodiments of the invention, are described in detail below with reference to the accompanying drawings.

BRIEF DESCRIPTION OF THE DRAWINGS

The accompanying drawings, which are incorporated herein and form part of the specification, illustrate, but do not limit, the present invention and, together with the description, further serve to explain the principles of the invention and to enable a person skilled in the pertinent art to make and use the invention.

DETAILED DESCRIPTION OF THE INVENTION

The present invention pertains to methods and apparatuses for the fabrication of sub-micrometer structures on substrates. For example, the process of the present invention can be used to build an electroplating mask for the formation of a miniature metallic electromagnetic pole tip structure.

The process of the present invention incorporates a silylation process to silylate photoresist after creating a photoresist cavity or trench in the electroplating mask. The silylation process is performed after a dry etch of the photoresist. Silylation causes this trench to narrow in width due to a "chemical biasing effect," a term which refers to the lateral (and, in some cases, vertical) expansion of the photoresist. As a result of chemical biasing, the vertical side walls of the photoresist layer shift inward creating a narrower trench. The resulting structure formed after electroplating is narrower in width (having a width of less than 0.3 micrometers ($\mu$m)) than a structure that is formed using a conventional dry etch process (having a minimum width of about 0.4 $\mu$m). This structure made according to the invention can be used as a magnetic pole of a thin film head ("TFH") for a data storage device.

Figure 1:
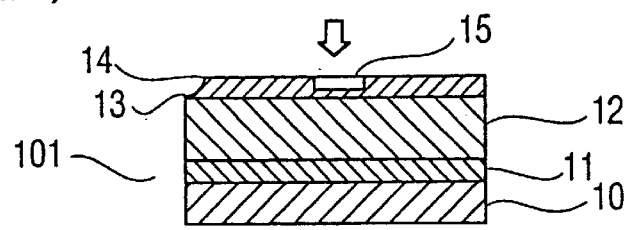
FIG. 1 is a schematic diagram of a conventional fabrication process.
Figure 1:
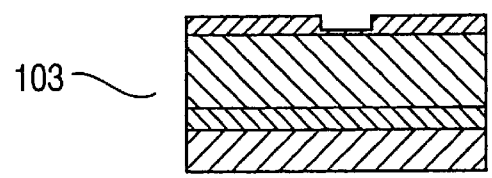
Figure 1:
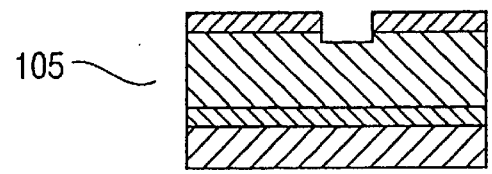
Figure 1:
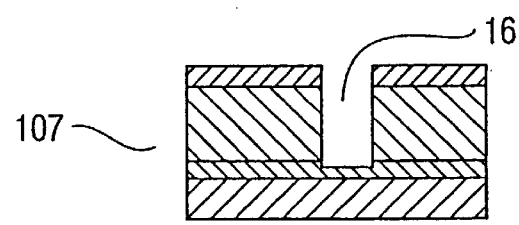
Figure 1:
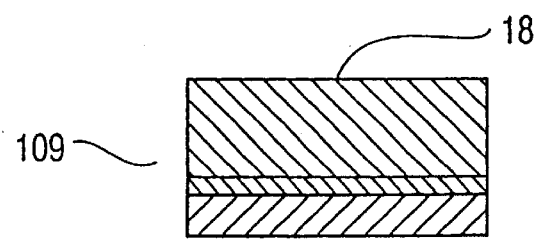
Figure 1:
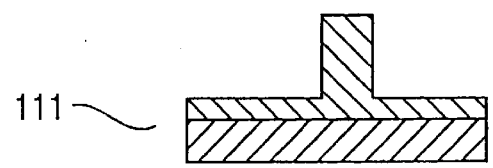
Figure 2:
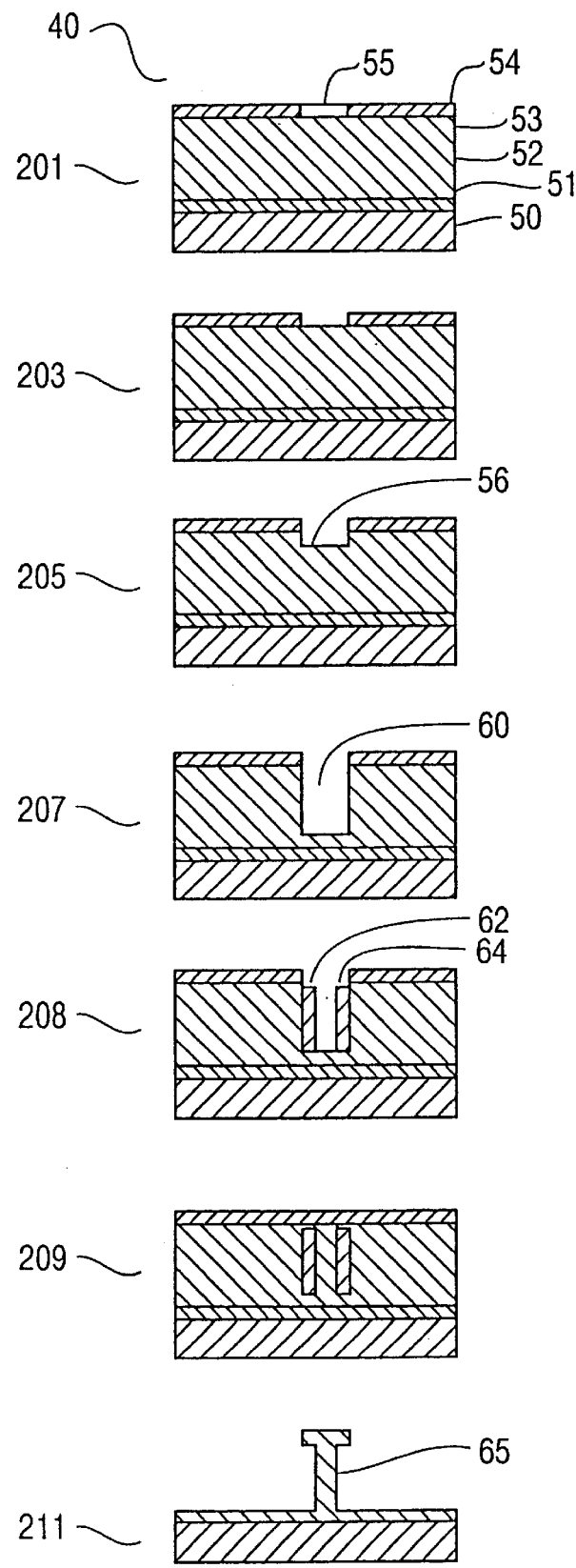
FIG. 2 is a schematic diagram of a process for fabricating sub-micrometer structures according to one embodiment of the present invention.

FIG. 2 shows a schematic diagram of the fabrication process according to one embodiment of the present invention, where an electroplating mask is created and used to form a magnetic pole piece having a high aspect ratio (height/width) and a width of less than 0.3 $\mu$m. Prior to the creation of the magnetic pole piece, a multi-layer mask 40 is formed on a wafer or substrate 50. Substrate 50 may comprise AlTiC, silicon (Si), glass or any conventional substrate.

A thin seedlayer 51 is deposited on the top surface of substrate 50. Seedlayer 51 can comprise, for example, a magnetic material such as Permalloy (NiFe), that acts as a seedlayer for electroplating. Other conventional magnetic or non-magnetic metallic substances can also be utilized, such as NiFeCo, FeMn, NiMnSb, CoFeB, CoSm, and other metals and alloys. Seedlayer 51 has an initial thickness of about 0.05 to about 0.3 $\mu$m.

A thick photoresist layer 52 is deposited on the surface of the seedlayer 51. The photoresist layer 52 can comprise a conventional photoresist or a polymeric substance. Layer 52 has an initial thickness of about 4 to 6 $\mu$m.

Optionally, a protective layer (not shown), such as alumina or silicon dioxide, can be formed or deposited on the top surface of seedlayer 51, with photoresist layer 52 being formed on top of the protective layer. The protective layer can be used to prevent damage to the seedlayer which can occur under some etching processes.

A hard mask layer 53 is deposited on photoresist layer 52. Layer 53 can comprise an oxide layer, such as silicon oxide ($SiO_2$), or an Al, Tantalum (Ta), or other metal layer. Layer 53 acts as a hard mask for photoresist etching. A thin, second photoresist layer (or "image layer") 54 is deposited on hard mask layer 53. The term "image layer" is used because patterning is initiated in layer 54, which is about 1.0 $\mu$m or less in thickness.

In step 201, the thin photoresist (image) layer 54 is lithographically patterned with a resolution of about 0.3 to 0.4 $\mu$m (the current state of the art) under a conventional exposure process to create a well 55. For example, a master mask (not shown) can be imaged with reduction on the thin photoresist layer. The process of the present invention should be equally effective with higher lithographic resolutions due to future improvements in the art.

Next, in step 203, a conventional wet development step (using a conventional developer) is utilized to produce a profile having a substantially horizontal top surface and substantially vertical side surfaces for well 55.

Next, in step 205, a hard mask etch is performed to remove the exposed portion 56 of hard mask layer 53 to further form a trench for plating. Photoresist layer 52 is subjected to a conventional dry etch in step 207. For example, a RIE process can be performed with a plasma etching system to remove a portion of photoresist layer 52 to create an initial trench 60. The RIE process forms straight, vertical sidewalls that initially define the mask profile or trench of mask 40. The RIE process may comprise oxygen-based RIE, or other appropriate processes, depending on the materials used for the photoresist layer and hard mask layer, and seed layer.

Alternatively, an Inductively Coupled Plasma etching ("ICP") technique can be used to perform the photoresist etch of layer 52. An ICP dry etch offers an advantage in that it can be controlled such that no protective layer is necessary to protect the seedlayer. An ICP process differs from an RIE process in that the mechanical and chemical portions of the ICP process can be separately controlled. This separate control allows the ICP process to be less damaging to seed layer.

According to an embodiment of the present invention, trench 60 is then subjected to silylation in step 208. As a result of a "chemical biasing effect," the silylation causes the volume of photoresist layer 52 to increase, which in turn causes this trench to narrow in width. Silylation, which is the replacement of an active hydrogen of a protic material with a substituted silicon atom, provides a straightforward process in which the width of trench 60 can be narrowed in a controllable manner. By performing silylation on the resist, the resist is both hardened and expanded in volume. Silylation can be performed in a conventional manner, such as by a wet/solution-based chemical process or by vapor silylation. For example, the mask can be soaked in an organo-metallic silylation agent.

For example, mask 40 can be treated with a silylation agent to silylate the vertical edges 62, 64 of the resist layer 52 for a predetermined time. The resulting narrow trench is used as a mask for plating in step 209.

Figure 3:
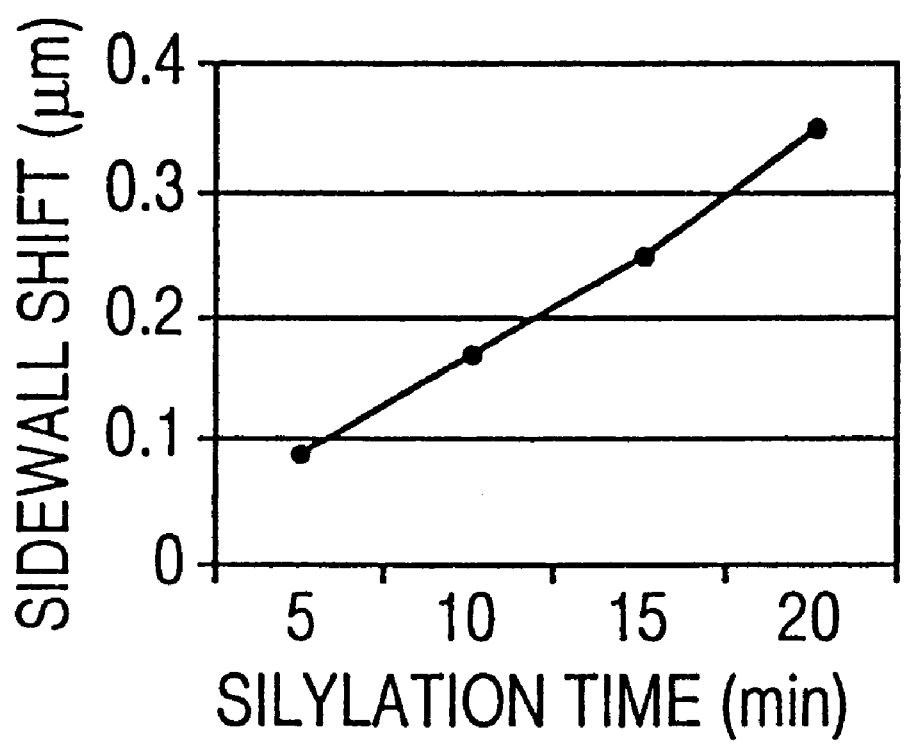
FIG. 3 shows the relationship between sidewall shift and silylation time.

FIG. 3 shows the dependence of sidewall shift versus silylation time. See e.g., U.S. Pat. No. 4,803,181, issued to Buchmann et al. For example, treating an etched photoresist for a period of about 20 minutes can cause the sidewalls to laterally shift towards the center of the trench by about 0.35 $\mu$m on each side.

In most conventional processes using a multi-level mask structure, such as described in the '251 patent, silylation is only used to adjust the dimensions of the starting layer (i.e., the thin photoresist or image layer). These conventional processes then use a dry etch to form the vertical sidewalls of the thick photoresist layer. However, the conventional structures formed using dry etch processes have a width of about 0.3 to 0.4 $\mu$m and cannot be narrowed further using a dry etching technique. According to the present invention, on the other hand, the dry etch process is completed prior to silylation, so that the vertical sidewalls of the thick photoresist layer can be increased, thereby narrowing the width of the cavity formed. By performing the silylation step after the dry etch is completed, narrow structures, such as narrow magnetic pole pieces can be fabricated in a controlled manner.

In step 209, an electroplating process is performed to form a sub-micrometer structure having a high aspect ratio. For example, in step 209, mask 40 can be placed in a conventional electroplating solution, with current applied to the seed layer so that a NiFe magnetic pole structure is formed within the resist trench. Other conventional electroplating processes also can be utilized.

After formation of the magnetic pole structure, the remaining hard mask and photoresist are stripped in step 211 in a conventional manner. For example, RIE can be used to remove the remaining hard mask layer 53 and photoresist layer 52.

The resulting pole piece 65 has a high aspect ratio, having a height of about 5 μm and a width of less than 0.3 μm.

Figure 4:
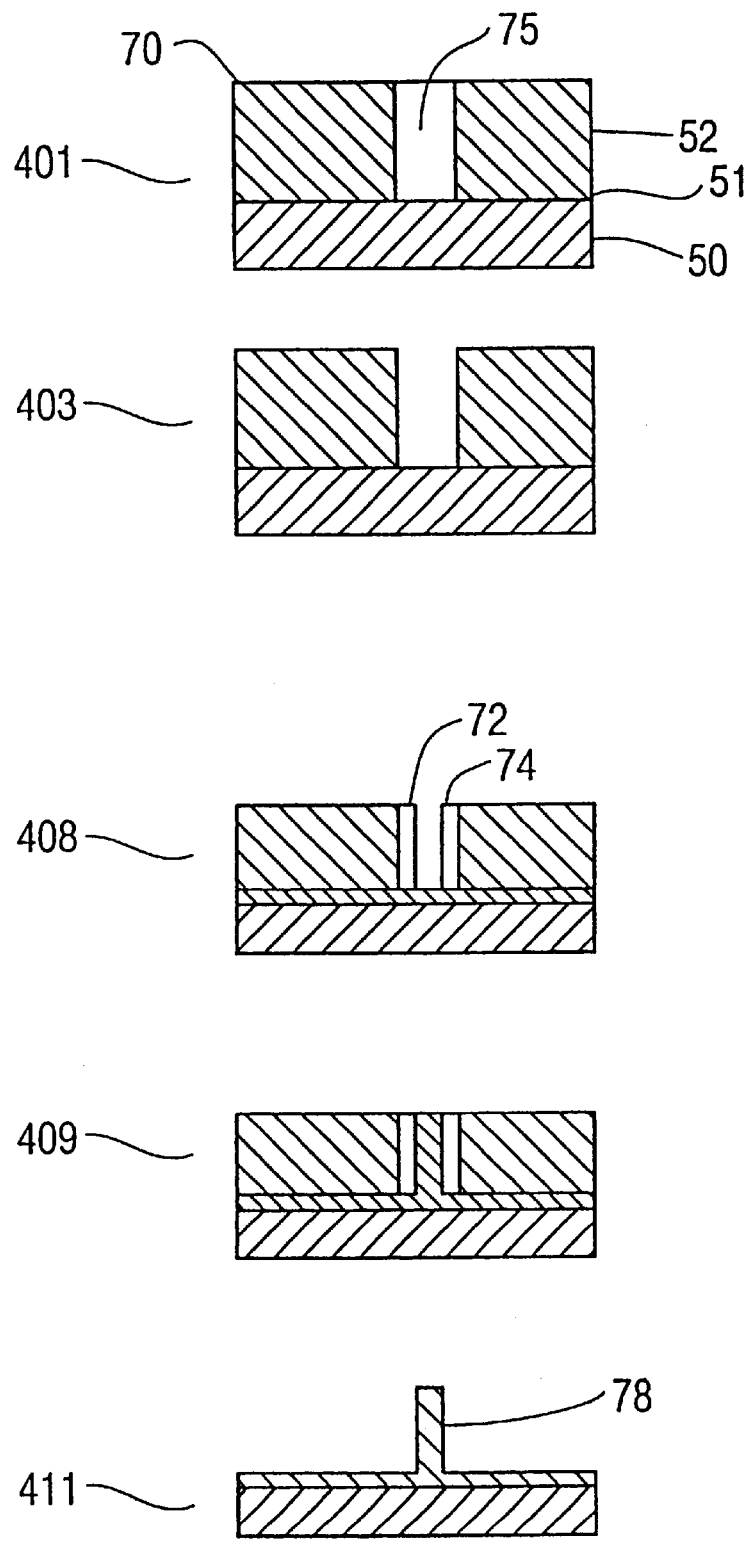
FIG. 4 is a schematic diagram of a process for fabricating sub-micrometer structures according to another embodiment of the present invention.

A second embodiment of the process of the present invention is shown in FIG. 4. A multi-layer mask 70 is formed on a wafer or substrate 50. Wafer 50 is coated with a seedlayer 51 and a thick photoresist layer 52. Unlike the embodiment shown in FIG. 2, multi-layer mask 70 does not include a hard mask layer or a thin photoresist layer. Thus, in the embodiment shown in FIG. 4, photoresist layer 52 acts as an image layer for the electroplating mask.

In step 401, layer 52 is lithographically patterned with a resolution of about 0.4 μm under a conventional exposure process to create a well 75. In step 403, a conventional wet development step (using a conventional developer) is utilized to produce a profile having a substantially horizontal top surface and substantially vertical side surfaces for well 75 (at least for the major portion of it's height).

In step 408, the electroplating mask is treated with a silylation agent to silylate the vertical edges 72, 74 of the resist layer 52 for a predetermined period of time, based on the desired width of the structure formed under electroplating. For example, the resulting narrow trench can be used as a mask for magnetic pole plating in step 409. The excess photoresist is stripped in step 411. Thus, an advantage of this embodiment of the present invention is that an exposure step can be used to form the mask trench, without having to perform subsequent hard mask or RIE/ICP photoresist etch steps because the silylation process can substantially narrow the trench for plating.

Figure 5:
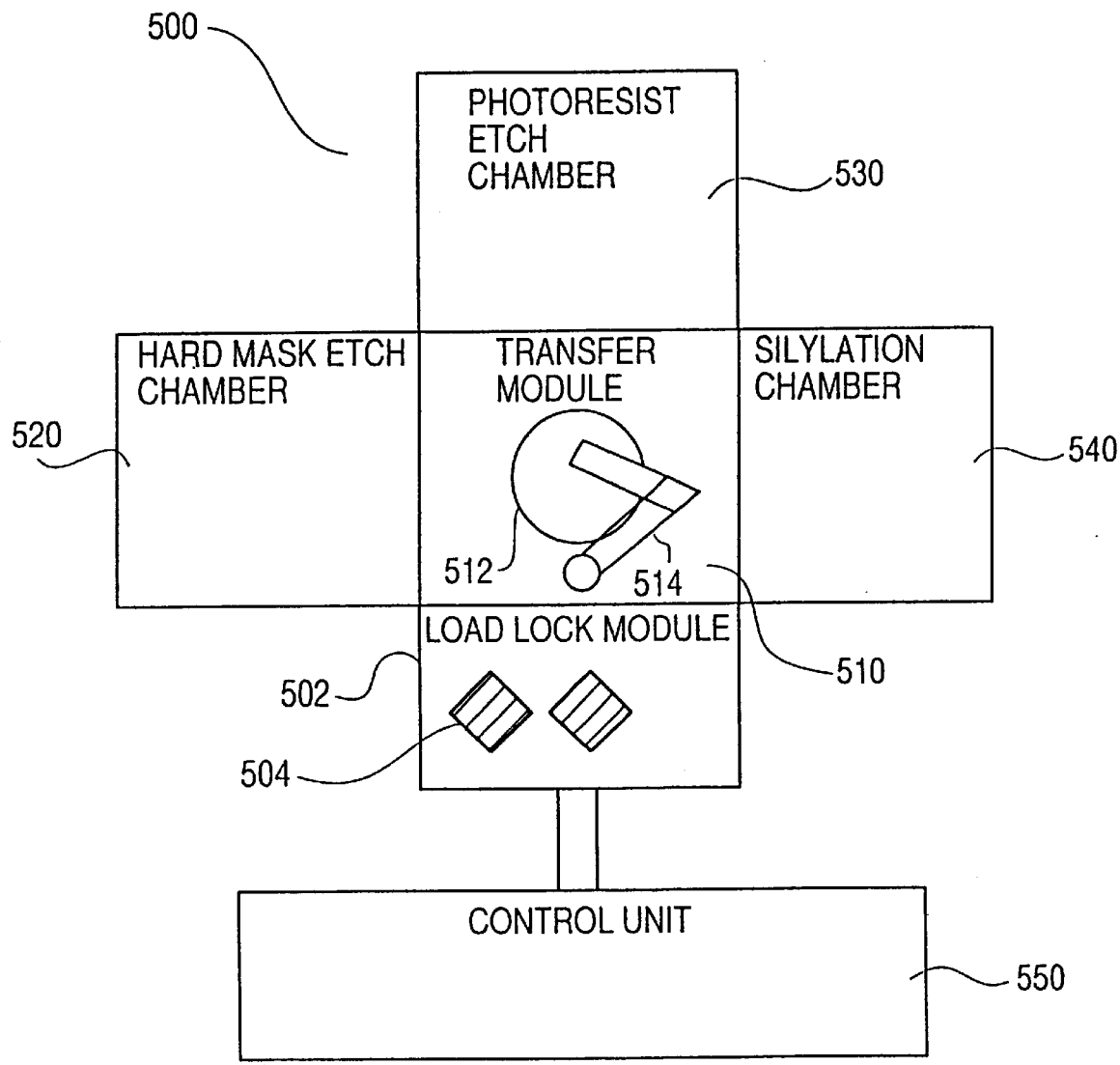
FIG. 5 is a schematic diagram of a device of the present invention to fabricate an electroplating mask.

According to a further embodiment of the present invention, a device can be utilized to perform the dry etch (hard mask and photoresist etch) steps and the silylation step to fabricate an electroplating mask. As shown in FIG. 5, an exemplary processing unit 500 is shown having a load lock module 502, a transfer module 510, a hard mask chamber 520, a photoresist etch chamber 530, a silylation chamber 540, and a control unit 550. For example, the process steps can be performed in a modified commercial unit, such as a Versalock® 700 model processing platform (available from Plasma-Therm Inc.), a semi-automated handling system and general purpose tool for use in a wide variety of semiconductor fabrication applications.

In one mode of operation, a robotic handling system 514 in transfer module 510 takes wafers 504 out of a storage cassette 510, which have been loaded from a lock load module 502. The robotic system then loads the wafers into the appropriate processing chamber. In this example, the wafers are pre-formed multi-layer electroplating masks, such as mask 40 in FIG. 2. A first vacuum chamber, such as hard mask chamber 520, can be used to perform a hard mask etch of an electroplating mask having a hard mask layer, such as a silicon oxide layer. The hard mask etch can be performed by a Reactive Ion Etching ("RIE") technique or an Inductively Coupled Plasma etching ("ICP") technique.

After the hard mask process, the robotic system then loads the masks into the photoresist etch chamber 530. This vacuum chamber can utilize an ICP or RIE technique to etch a thick photoresist layer of an electoplating mask.

After the photoresist etch is completed, the robotic system then loads the masks into the silylation chamber 540. As discussed above with respect to step 208 of FIG. 2, the silylation process can comprise either a wet chemistry or vapor silylation process. The silylation will allow the operator to control the width of the trench formed in the electroplating mask, in order to form narrow structures during electroplating. The silylation time can be preset or controlled through control unit 550, which includes a graphical user interface to allow an operator to control all aspects of the processing.

The device and process of the present invention have several applications. First, the invention can be utilized as a microfabrication technique for plated submicrometer structures. In particular, the invention can be utilized to fabricate electroplating masks used for the formation of magnetic pole tips for read/write heads of data storage devices. The process of the present invention also can be adapted to the formation of micro-electro-mechanical systems ("MEMS") with high aspect ratio structures. In addition, the invention can be used to form noble metal (gold, silver, copper) structures which are difficult in practice to etch anisotropically. Further, the process of the invention can be adapted for the formation of micro-fabricated optics, opto-electronics elements, in particular diffractive optics components.

While the invention has been described in detail and with reference to specific embodiments thereof, it will be apparent to one skilled in the art that various changes and modifications can be made therein without departing from the spirit and scope of the invention. Thus, the breadth and scope of the present invention should not be limited by any of the above-described exemplary embodiments.

What is claimed is:

1. A method for fabricating a multi-layer electroplating mask for the formation of a submicrometer structure, the multi-layer electroplating mask including a substrate, a seedlayer deposited on said substrate, a first photoresist layer deposited on said seedlayer, a hard mask layer deposited on said first photoresist layer, and a second photoresist layer deposited on said hard mask layer, said first photoresist layer being thicker than said second photoresist layer, comprising:

performing a photoresist etch of said first photoresist layer to define a trench having vertical sidewalls; and after said photoresist etch, performing a silylation of said trench for a predetermined period of time to narrow said trench in width.

2. The method according to claim 1, wherein said photoresist etch comprises a reactive ion etching process.

3. The method according to claim 1, wherein said photoresist etch comprises an inductively coupled plasma etching process.

4. The method according to claim 1, further comprising: prior to said photoresist etch, lithographically patterning said second photoresist layer with an exposure;

developing the second photoresist layer; and etching said hard mask layer.

5. A method for fabricating a multi-layer electroplating mask for the formation of a submicrometer magnetic structure, the multi-layer electroplating mask including a substrate, a seedlayer deposited on said substrate, and a photoresist layer deposited on said seedlayer, said photoresist layer having a thickness of about 4 micrometers to about 6 micrometers, comprising:

lithographically patterning said photoresist layer with an exposure to define a trench having vertical sidewalls; and performing a silylation of said trench for a predetermined period of time to narrow said trench in width.

6. The method according to claim 5, further comprising:
prior to said silylation, developing said photoresist layer.

7. A method of fabricating a submicrometer structure from a multilayer electroplating mask structure that includes a substrate, a seedlayer deposited on said substrate, and a first photoresist layer deposited on said seed-layer, comprising:

lithographically patterning said photoresist layer with an exposure to define a trench having vertical sidewalls;

developing said photoresist layer;

performing a silylation of said trench to narrow said trench in width;

performing an electroplating process to form a submicrometer structure that is coupled to said seedlayer.

8. The method according to claim 7, wherein said formed structure has a width of less than 0.3 micrometers.

9. The method according to claim 7, further comprising:
removing excess photoresist from said mask after said electroplating.

10. The method according to claim 7, wherein said seedlayer comprises a metallo-magnetic material, and wherein said structure formed is a magnetic pole.

11. A method of fabricating a submicrometer structure from a multi-layer electroplating mask structure that includes a substrate, a seedlayer deposited on said substrate, a first photoresist layer deposited on said seedlayer, a hard mask layer deposited on said first photoresist layer, and a second photoresist layer deposited on said hard mask layer, said first photoresist layer being thicker than said second photoresist layer, comprising:

performing a photoresist etch of said first photoresist layer to define a trench having vertical sidewalls;

after said photoresist etch, performing a silylation of said trench for a predetermined period of time to narrow said trench in width; and performing an electroplating process to form a submicrometer structure that is coupled to said seedlayer.

12. The method according to claim 11, wherein said formed structure has a width of less than 0.3 micrometers.

13. The method according to claim 11, further comprising:

prior to said photoresist etch, lithographically patterning said second photoresist layer with an exposure;

developing the second photoresist layer; and etching said hard mask layer.

14. The method according to claim 11, further comprising:

removing excess photoresist from said mask after said electroplating.

15. The method according to claim 11, wherein said multi-layer electroplating mask structure further includes a protective layer disposed in between said seed-layer and said first photoresist layer.

16. The method according to claim 11, wherein said seedlayer comprises a metallo-magnetic material, and wherein said structure formed is a magnetic pole.

* * * * *